(12) United States Patent
Guardia

(10) Patent No.: US 12,202,172 B2
(45) Date of Patent: Jan. 21, 2025

(54) LEVERING MECHANISM FOR A CERAMIC CUTTER DEVICE

(71) Applicant: Carlos Manoel Guardia, Mogi Mirim (BR)

(72) Inventor: Carlos Manoel Guardia, Mogi Mirim (BR)

( * ) Notice: Subject to any disclaimer, the term of this patent is extended or adjusted under 35 U.S.C. 154(b) by 307 days.

(21) Appl. No.: 17/783,465

(22) PCT Filed: Dec. 1, 2020

(86) PCT No.: PCT/BR2020/050509
§ 371 (c)(1),
(2) Date: Jun. 8, 2022

(87) PCT Pub. No.: WO2021/119777
PCT Pub. Date: Jun. 24, 2021

(65) Prior Publication Data
US 2023/0021293 A1    Jan. 19, 2023

(30) Foreign Application Priority Data
Dec. 20, 2019   (BR) ..................... BR2020190275168

(51) Int. Cl.
*B28D 1/22*     (2006.01)

(52) U.S. Cl.
CPC .................................. *B28D 1/225* (2013.01)

(58) Field of Classification Search
CPC .................................. B28D 1/22; B28D 1/225
USPC ........................................................ 225/96.5
See application file for complete search history.

(56) References Cited

FOREIGN PATENT DOCUMENTS

| BR | MU9100623 U2 | * | 11/2014 |
| CL | 200200593 A | | 12/2002 |
| EP | 0277827 A1 | | 8/1988 |
| EP | 0490268 A1 | * | 6/1992 |
| EP | 0592345 A2 | * | 4/1993 |
| ES | 2101611 A1 | | 7/1997 |

OTHER PUBLICATIONS

Translation EP 0490268A1 (Year: 2024).*
International Search Report mailed Mar. 11, 2021, in corresponding to International Application No. PCT/BR2020/050509; 3 pages.

(Continued)

*Primary Examiner* — Nhat Chieu Q Do
(74) *Attorney, Agent, or Firm* — Maier & Maier, PLLC

(57) ABSTRACT

A levering mechanism for a ceramic cutter device includes a main body assembly and an actuator element. The main body assembly includes a first and a second body structure, both being pivotably connected to each other by a first articulation, so that a first and a second pivoting end positions are defined. The actuator element is pivotably connected to the first body structure and includes a curvilinear base in contact with a contact pivot shaft transversally arranged on the second body structure, the curvilinear base defining a first and a second leverage positions. The levering structure is configured such that when the first body structure is pivoted from the first to the second pivoting end position, the pivoting movement of the first body structure causes the actuator element to move from the first leverage position to the second leverage position.

20 Claims, 11 Drawing Sheets

(56) References Cited

OTHER PUBLICATIONS

Written Opinion of the International Searching Authority issued Mar. 11, 2021, in corresponding to International Application No. PCT/BR2020/050509; 6 pages.
Expert's Report issued on Jan. 15, 2024, in corresponding Chilean Application No. 202201687, 28 pages.
Search Report issued on Jan. 15, 2024, in corresponding Chilean Application No. 202201687, 6 pages.

* cited by examiner a)

b)

c)

a)

b)

a)

b)

a)

b)

a)

b)

LEVERING MECHANISM FOR A CERAMIC CUTTER DEVICE

CROSS-REFERENCE TO RELATED APPLICATIONS

This application is a national stage of International Patent Application No. PCT/BR2020/050509, filed on Dec. 1, 2020, which claims priority to Brazilian Patent Application No. BR2020190275168, filed on Dec. 20, 2019, the entire contents of which are incorporated herein by reference.

FIELD OF THE INVENTION

The present invention is in the field of ceramic cutters for scoring and sectioning ceramic tiles. In particular, the invention relates to a levering structure providing an enhanced functionality when applied into manual ceramic cutters.

BACKGROUND OF THE INVENTION

Currently known manual ceramic cutter devices normally comprise a guided carriage which is displaceable along at least one longitudinal guide. The guided carriage is normally equipped with a scoring tool and a breaking tool, and a main lever.

The scoring tool is configured for scoring, i.e. partially cutting the ceramic tile, along a longitudinal line defined by the displacement of the guided carriage along the at least one longitudinal guide. The scoring, or cutting, only affects a percentage of the total thickness, thus not resulting in the ceramic tile being separated into two separate parts. Instead, the ceramic tile is marked with a line defining a weakened section.

The breaking tool is configured for providing a force on the ceramic tile in order to break it along the line previously defined by the scoring tool, thus separating the ceramic tile into two separate parts.

Each tool, i.e. the scoring tool and the breaking tool, are configured to be positioned in two different positions when using the manual ceramic cutter: an operative position and an inoperative position. When a tool is positioned in its operative position, the tool is available to be used by the device, i.e. the scoring tool is available for scoring on the ceramic tile, and the breaking tool is available for breaking the ceramic tile. The ceramic part to be separated is normally arranged in a horizontal position just below position of the tools. The scoring tool and the breaking tool cannot be used simultaneously. Thus, when the scoring tool is in its operative position, the breaking tool must be in its inoperative position. Likewise, when the breaking tool is in its operative position, the scoring tool must be in its inoperative position. The force required by the device to perform the scoring and breaking operations is provided by the user by means of the main lever.

Therefore, the technical solution for providing a mechanism suitable for allowing the change of positions of the scoring and breaking tools is a very critical design feature when it comes to manual ceramic cutter devices. Considering that the normal work flow consists of positioning a ceramic part in the device, then scoring it by means of the scoring tool and, finally, breaking the ceramic part by means of the breaking tool, it is particularly important for the user to have a very easy to use and operate mechanism for moving the scoring tool, in particular, from its operative position to its inoperative position, while the breaking tool is simultaneously moved from its inoperative position to its operative position. Currently known solutions for this problem include the use of mechanisms that the user has to operate in a fully manual manner, i.e. the user has to stop working in order to manipulate the device in order to change the position of the tools. The main disadvantage of this kind of solutions is that the user is forced to stop the working sequence and use both hands for changing the position of the tools between the scoring operation and the breaking operation.

Additionally, some solutions known in the state of the art include the use of curved slot-guided mechanisms. When using this type of configurations, the user may be forced to apply a high amount of force onto the lever. This is because the normal force between the guided element and the lateral of the slot, which is responsible for causing frictional forces, is not always constant on both sides of the slot, which results in an uneven and irregular transition of the movement, and sometimes causes abrupt movements during the transition between positions of the tools. Irregular, abrupt or uncomfortable transitions can, under conditions of prolonged use, lead to injury or pain for the user of the device.

Therefore, there is room for technical improvement regarding manual ceramic cutter devices.

SUMMARY OF THE INVENTION

The present invention addresses the problem of providing a mechanism for a manual ceramic cutter device, which provide a smooth transition of movement when changing the positions of the tools, and which allows the user to keep his hands in the operating position while making the transition by operating the lever. This problem is solved by a levering structure for a ceramic cutting and breaking device and by a manual ceramic cutter device according to the embodiments disclosed herein.

A first aspect of the invention refers to a levering structure for a ceramic cutter device. Ceramic cutter devices are also known as ceramic cutting and breaking devices, and also as ceramic scoring and breaking devices. The levering structure may comprise a main body assembly and an actuator element.

The main body assembly may comprise a first body structure and a second body structure, both comprising respective front and rear end portions. The first body structure may extend longitudinally, i.e. between its respective front and rear end portions, along a first direction. The first direction may extend at least partially along a first horizontal direction, i.e. the horizontal component of the vector defining the direction of the first direction may be coincident or parallel to the direction defined by the first horizontal direction. The first body structure may be configured as an elongated beam, being straight or partially curved. The elongated beam may be further configured as a beam having a substantially U-shaped cross-section, and comprising a central face and two lateral walls, wherein the lateral walls may be parallel to each other, or may be divergently arranged from the central face. The second body structure may extend longitudinally between its respective front and rear end portions. The second body structure may extend longitudinally along said first direction or along a second direction, wherein said second direction may extend at least partially along said first horizontal direction, i.e. the horizontal component of the vector defining the second direction may be coincident or parallel to the direction defined by the first horizontal direction.

The rear end portion of the first body structure may comprise a first coupling mechanism for coupling a cutting tool. The first coupling mechanism may be configured, for example, as a threaded hole. In some embodiments, the rear end portion of the first body structure may have a transversally arranged closing wall closing the substantially U-shaped cross-section, wherein the first coupling mechanism may be arranged in this closing wall. The second body structure may comprise at least one contact pivot shaft transversally arranged with respect to the first direction. The at least one contact pivot shaft may traverse the second body structure by at least one through-hole. Preferably, the contact pivot shaft may be located at a position between the front and rear portions of the second body structure. The rear end portion of the second body structure may comprise a second coupling mechanism for coupling a breaking tool. The second coupling mechanism may be configured as a coupling articulation, such that the breaking tool can pivot/swivel with respect to the second body structure around a coupling axis transversally arranged with respect to the first direction and located at the rear end portion of the second end body structure.

The cutting tool may comprise an elongated body having a proximal end and a distal end. The proximal end may be couplable to the first coupling mechanism, while the distal end may comprise a cutting element, e.g. a cutting disc or a cutting blade.

The breaking tool may comprise an elongated body transversally arranged with respect to the first direction. The breaking tool may preferably be a monobloc part. The breaking tool may be arranged horizontally, and may further comprise at least two contact points to be pressed against the ceramic part to be broken. The at least two contact points may be arranged along the elongated body, but at a distance from each other, so that a contact point between the cutting tool and the ceramic part to be broken may be located between them, preferably being equidistant to the at least two contact point of the breaking tool.

The front end portions of the first and second body structures are pivotably connected to each other by means of a first articulation. Thus, the first body structure can pivot/swivel with respect to the second structure around a first axis, transversally arranged with respect to the first direction, from a first pivoting end position towards a second pivoting end position.

The actuator element may comprise a lower section comprising a lower end portion, and an upper section comprising an upper end portion. The actuator element may be pivotably connected to the first body structure by means of a second articulation, such that the actuator element can pivot/swivel with respect to the first body structure around a second axis transversally arranged with respect to the first direction. The lower end portion of the actuator element may have a curvilinear base having at least a first concave portion and a second concave portion, respectively configured to rest on the contact pivot shaft in a first leverage position and a second leverage position. The curvilinear base may have a smooth profile continuously and smoothly connecting the first and second concave regions, thus allowing smooth transitions between the two levering position. The smooth profile also allows the force needed to move the actuator element between its two leverage positions to be increased continuously and smoothly until the position change is achieved. The first concave portion and the second concave portion may be mutually separated by a first convex portion, so that the effect of obtaining a smooth transition is maintained while, at the same time, the chances of involuntarily moving the actuator between its two leverage positions are reduced, inasmuch as the concave portions allows a graduation of the force required to perform the operations of changing the position. The lower section of the actuator may be shaped in the form of a flat block with a substantially triangular outline and a moderately wavy and curvilinear.

The first body structure may comprise an elongated and longitudinally arranged through hole on the central face of its U-shaped longitudinal profile. This through hole may be configured for receiving the actuator element, such that when the actuator element pivots/swivel with respect to the first body structure around the second axis, the through hole provides limits the maximum amplitude of the pivoting movement of the actuator element. The through hole may be configured, e.g. as a rectangular or an elliptical cut-out.

The main body assembly is further configured such that when the first body structure is pivoted/swiveled from the first pivoting end position to the second pivoting end position, the pivoting movement of the first body structure causes the actuator element to move from the first leverage position to the second leverage position. The leverage distance between the first axis and a contact point of the curvilinear base with the contact pivot shaft is shorter in the second leverage position than in the first leverage position.

According to preferred embodiments of the invention, the first coupling mechanism may be arranged at a point between the front and rear end portions of the first body structure. The first coupling mechanism may be further preferably arranged between the second articulation and the rear end portion of the first body structure.

The upper section of the actuator element may comprise an elongated contact body extending from the second articulation at least partially along the first direction or the first horizontal direction, and may be arranged at least partially above the rear end portion of the first body structure. Preferably, the elongated contact body may be curved downwards. The elongated contact body may further comprise an upper end portion comprising a contact element. The contact element may have several shapes and/or geometries, e.g, the contact element may be shaped as a cylinder, a sphere or as any kind of regular or irregular polyhedral prism. Preferably, the elongated contact body may further comprise two elongated arms, arranged in parallel, and connected to each other at their respective ends by means of the contact element. Thus, the upper section of the actuator element may be shaped in the form of a slightly curved two-pronged handle transversally equipped at the upper end portion with a cylindrical structure.

The levering structure may comprise a lever element attached to the first body structure and configured for driving the pivoting movement of the first body structure. In preferred embodiments, the lever element may be attached to the rear end portion of the first body structure by means of a third coupling mechanism. The elongated contact body may be further configured such that, when the first body structure is pivoted/swiveled from the first pivoting end position to the second pivoting end position, the pivoting movement of the first body structure causes the first body structure and/or the lever element to push the elongated contact body, so that the actuator element is moved from the first leverage position to the second leverage position. In preferred embodiments, the contact element is the part of the elongated contact body that is configured to contact with the first body structure and/or the lever element so that the elongated contact body can be pushed. The contact between the elongated contact body and the first body structure and/or the lever element may take place when first body structure is transitioning from its first pivoting end position to its second pivoting end position. Alternatively, the elongated contact body and the first body structure and/or the lever element may already be in contact when the first body structure is positioned in the first pivoting end position. The lever element is preferably configured as a lever bar.

The levering structure may comprise a cutting tool for scoring a ceramic part, and a breaking tool for breaking said ceramic part. The cutting tool may be coupled to the first coupling mechanism. The breaking tool may be coupled to the second coupling mechanism. The levering structure may be configured such that when the actuator is in the first leverage position and the first body structure is in the first pivoting end position, a distal end of the cutting tool is arranged below the breaking tool, such that the cutting tool can reach a ceramic part positioned below the levering structure without the breaking tool reaching the ceramic part. This positon of the levering structure is the scoring position.

Additionally, the levering structure may be configured such that when the actuator is in the second leverage position and the first body structure is in the second pivoting end position, a distal end of the cutting tool is arranged over the breaking tool, such that the breaking tool can reach the ceramic part. This position of the levering structure is the breaking position.

In preferred embodiments, the levering structure may be further configured such that when the actuator element is in an intermediate position between the first and second leverage positions, and the first body structure is in an intermediate position between the first and second pivoting end positions, both the distal end of the cutting tool and the breaking tool are arrange at a distance of the ceramic part, such that they cannot reach the ceramic part.

The levering structure may comprise at least one bias element configured for biasing/pretensioning the lower end portion of the actuator element against the contact pivot shaft, such that the curvilinear base of the actuator element remains in contact with the contact pivot shaft, in particular while moving between the first leverage position and the second leverage position. The at least one bias element may be an elongated elastic element comprising a first and a second end portions, e.g. an elastomeric part or a spring, preferably a helical return spring. The at least one elongated elastic element may be configured to variable length, having a linear or a nonlinear relationship between force and displacement.

The first end portion of the at least one bias element may be connected, preferably pivotably connected, to the first body structure and/or the second axis, wherein the connection exclusively to the first body structure is preferred. The second end portion of the at least one bias element may be connected, preferably pivotably connected, to the second body structure of the main body assembly and/or to the breaking tool, wherein the connection exclusively to the breaking tool is preferred.

The second end portion of the at least one bias element may be connected to the second body structure of the main body assembly and/or to the breaking tool, which can be coupled to the second body structure by means of the second coupling mechanism. In preferred embodiments, the at least one bias element may be connected to a point of the second body structure located between the contact pivot shaft and the rear end portion of the second body structure, thus providing for the at least one bias element an angle of inclination differing from that of a segment defined between the second axis and the contact pivot shaft, the segment being arranged perpendicular to both axes. The length and inclination of said segment is different for the first and for the second leverage positions of the actuator element, however, the at least one bias element is always arranged defining a different angle of inclination independently of whether the actuator is positioned in its first or in its second leverage position, and independently of whether the actuator is second end portion of the at least one bias element may be connected to the second body structure of the main body assembly or to the breaking tool. Therefore, a triangular structure may be formed by the bias element, the leverage distance between the first end portion of the bias element and the contact pivot shaft 3A, and the leverage distance between the contact pivot shaft 3A and the second end portion of the bias element. The different angle of inclination of the at least one bias element is also achieved when the second end portion of the at least one bias element is directly connected to the breaking tool, inasmuch as the breaking tool is coupled to the rear end portion of the second body structure. The fact of having different angles of inclination for the at least one bias element and for the previously described segment has the advantage that a more controlled and progressive transition between the different positions of the actuator element can be obtained, as the at least one bias element acts as extra bar for the mechanism defined by the levering structure, providing a more smooth an stabilized kinematic movement to the levering structure due to the fact of being able to vary its length and provide an adapted force.

In some embodiments, when the second end portion of the at least one bias element is connected directly to the breaking tool, the second coupling mechanism of the second body structure may be configured as a contact base or profile located on a lower end portion of the rear end portion of the second body structure. The contact base may extend longitudinally between a first end position and a second end position. The first end position of the contact base may be arranged closer to the contact pivot shaft, whereas the second end position of the contact base may be arranged closer to the second end portion of the second body structure. Said contact base may be shaped as a curvilinear base, a rectilinear base or a combination thereof. Said contact base may be configured to be in contact with at least one contact component of the breaking tool. The at least one contact component may be configured as a pin, preferably arranged transversally with respect to the first direction, and more preferably being configured as a cylindrical or polyhedral pin. Thus, the at least one contact component of the breaking tool may be kept in contact with the contact base as a result of a force provided by biasing/pretensioning action of the bias element. In some embodiments compatible with this configuration, the breaking tool may be configured to be displaceable along the contact base of the second body structure between its first end position and its second end position.

Additionally, the at least one bias element and/or the shape of the contact base may be further configured to provide a biasing/pretensioning force to pull the breaking tool towards the first end position contact base, e.g. by arranging the at least one biasing element with an inclination angle with respect to a vertical direction. In some embodiments, the contact base may have a resting position, e.g. a curved concave position arranged on the contact base, for determining a predetermined position of said contact point. In alternative embodiments, said resting position may restrict or avoid the sliding of the of the breaking tool with respect of the contact base, while allowing a pivotably contact.

In some embodiments, the levering structure may comprise two bias elements compatible with all the feature already described. The two bias elements may be arranged symmetrically, e.g. they may be symmetrically arranged with respect to a plane coinciding and/or being parallel to the first direction and being substantially coincident with the center of gravity of the levering structure. For example, a first bias element may be connected to the second axis while being arranged at a first lateral side of the actuator element, and a second bias element may be connected to the second axis while being arranged at a second lateral side of the actuator element. This has the technical effect of providing an extra kinematic stabilization to the levering structure, in particular, focused on avoiding undesired lateral movements of the levering structure.

In some embodiments, the breaking tool may comprise extensible means configured to allow a guided rectilinear and vertical displacement of the breaking tool with respect to the second coupling mechanism. This feature provides the effect of allowing a homogeneous adjustment of the breaking tool to a ceramic part to be broken: firstly, the breaking tool contacts the ceramic part while the extensible means are in an extended position; secondly, the extensible means are progressively compressed against the ceramic part; finally, the breaking tool exerts a maximum force against the ceramic part for breaking it. The use of this kind extensible means in combination with having the second end portion of the at least one bias element directly connected to the breaking tool increases the effect of providing a progressive adjustment of the breaking tool to a ceramic part to be broken, thus ensuring that the breaking tool is correctly positioned on the ceramic part before exerting the force. Each extensible mean according to the invention may comprise at least two elongated elements, each element being displaceable relative to the other; alternatively or complementarily, each extensible mean may comprise an elastic mean configured to define a resting position of the breaking tool between a maximum extension position and a minimum extension position of said extension mean.

In some embodiments, the second body structure may comprise a forked section having a first arm and a second arm. The at least one contact pivot shaft may be connected to the first and the second arms of the second body structure. The at least one contact pivot shaft may traverse the forked section of the second body structure via respective through-holes located on each arm. Alternatively, a first contact pivot shaft may be connected to the first arm and a second pivot shaft may be connected to the second arm, wherein preferably both contact pivot shafts are aligned collinearly one in relation to the other. The first contact pivot shaft may traverse the forked section via a respective first through-hole located on the first arm, while the second contact pivot shaft may traverse the forked section via a respective second through-hole located on the second arm. Each arm of the forked section may comprise a respective contact base according to the features previously described, wherein each contact base may be configured to be in contact with a respective contact component of the breaking tool, according to the description already provided. Thus, each arm may provide a respective contact point, line or surface with the breaking tool.

In some embodiments, the second body structure of the levering structure may comprise a first body structure element having respective front and rear end portions, and a second body structure element having respective upper and lower end portions. The first body structure element may comprise the at least one contact pivot shaft. In preferred embodiments, the second body structure element may be shorter than the first structure body element, and may preferably be arranged in a substantially vertical position. The lower end portion of the second body structure element and the front end portion of the first body structure element may be pivotably connected to each other by means of a third articulation, such that the first body structure element can pivot/swivel with respect to the second body structure element around a third axis transversally arranged with respect to the first direction. Thus, the main body assembly may be configured as a trapezoid structure, i.e. a four-bar linkage defining a trapezoid, wherein the first body structure element may be configured as a pendular structure of the main body assembly. This configuration transforms the second body structure into a two-bar linkage sub-mechanism, which allows an improved transmission of the movement of the leverage structure, thus allowing the leverage structure to operate in a smoother and more energy-efficient way, reducing the effort required for operating the leverage structure. At the same time, in this configuration, when the actuator element is positioned in the second leverage position, the second body structure may be pivoted by actuating the lever element, so that the breaking tool can oscillate between a high position and a low position, while the actuator element remains in the second leverage position. Thus, this particular configuration has the particular technical advantage of providing a variable and adaptable multiplication of the force applied by the user through the operation of the lever element, wherein said multiplication of force is dependent on the position of the breaking tool.

This technical effect is even more evident when the second coupling mechanism is configured, as previously described, as a contact base arranged at the rear end portion of the first body structure element and configured to be in contact, by means of the action of the at least one biasing element, with the at least one contact component of the breaking tool. In this configuration, the breaking tool is displaceable by sliding contact along the contact base between the respective first and second end portions of the contact base, thus providing a variable length of the leverage arm defined by the distance between the contact pivot shaft and the breaking tool. Thus, the length of said levering arm increases as the breaking tool slides away from the first end position of the contact base while approaching the second end position of the contact base. This has the effect that as said lever arm increases its length, the force applicable by the breaking tool on a ceramic part decreases accordingly.

Additionally, the at least one bias element may be further configured such that, when the breaking tool is in its high position, the biasing/pretensioning force provided by the bias elements pulls the breaking tool towards the first end position of the contact base, so that the breaking tool is placed in the first end position of the contact base. This may be achieved, e.g. by arranging the bias element inclined and/or by selecting a compatible elastic constant for the bias element.

Additionally, the at least one bias element may be further configured such that, when the breaking tool is placed in its high position and the second body structure is progressively pivoted/swivel by actuating the lever element so that the breaking tool can reach its respective low position, the biasing/presentioning force is progressively overcome by a force provided by the levering structure, so that the breaking tool is progressively moved from its high position to its low position, while simultaneously it is also progressively slid from the first end position of the contact base to the second end position of the contact base.

This configuration allows a progressive elongation of the leverage arm defined by the distance between the contact pivot shaft and the breaking tool. Thus, the levering structure may be configured to provide higher breaking forces on ceramic parts having higher thicknesses than on ceramic parts with lower thicknesses, inasmuch as for ceramics parts having higher thicknesses the leverage arm defined by the distance between the contact pivot shaft and the breaking tool will be shorter, so that the force will be higher.

In some embodiments, the first body structure element may comprise a forked section having a first arm and a second arm. The at least one contact pivot shaft may be connected to the first and the second arms of the first body structure element. Alternatively, a first contact pivot shaft may be connected to the first arm, and a second pivot shaft may be connected to the second arm, wherein preferably both contact pivot shafts are aligned collinearly one in relation to the other.

A further aspect of the invention refers to a ceramic cutter device with a guided carriage comprising a levering structure according to any of the embodiments described hereinabove and configured for receiving a ceramic part. The ceramic cutter may comprise at least a first longitudinal guide arranged along the first horizontal direction. Each longitudinal guide may comprise a first longitudinal guide element, or a first and a second longitudinal guide elements. A respective second longitudinal guide element of a longitudinal guide may be arranged parallel to the respective first longitudinal guide element of same longitudinal guide, and preferably may be arranged in a lower position. The guided carriage may comprise at least a first support element movably coupled to the first longitudinal guide of the manual ceramic cutter for guiding a movement of the guided carriage in the first horizontal direction. The first horizontal direction may be arranged such that a horizontal component of the vector defining the direction of the first direction may be coincident or parallel to the first horizontal direction.

The main body assembly may be connected to the first support element by means of a first main body articulation, wherein the first main body articulation may be configured such that the main body assembly can rotate with respect to the first lateral support around a main body axis transversally arranged with respect to both the first direction and the first horizontal direction.

In preferred embodiments, the first main body articulation may be arranged on the internal side of the first support element, i.e. the side of the support element facing the levering structure, and may be configured as a circular or cylindrical bearing designed for the insertion of the ends of the main body axis.

In some embodiments, the first support element may be configured as a slidable bearing having a main tubular structure attachable and slidable with respect to the first longitudinal guide of the ceramic cutter device, in particular with respect to the first longitudinal guide element of the first longitudinal guide. According to some embodiments, the first support element may further comprise a first lower structure, arranged below the slidable bearing. In some embodiments, the first lower structure may be configured as an edge structure configured to be attachable and slidable with respect to a second longitudinal guide element of the first longitudinal guide.

In some preferred embodiments, the first support element may preferably further comprise a first lateral pivot guide connectable to the at least one contact pivot shaft, so that the at least one contact pivot shaft may be displaceable along the first lateral pivot guide. Preferably, the first lateral pivot guide may be vertically arranged. This provide the technical advantage of ensuring a more progressive movement and allowing an improved control over the position of the breaking tool along the first horizontal direction when performing a breaking operation, inasmuch as the breaking tool oscillates around the axis defined by the contact pivot shaft, and said pivot shaft is prevented from moving with respect to the support element along the first horizontal direction. This prevents undesired movements of the breaking tool, and reduces the risk of the tool sliding on the surface of the ceramic part, therefore reducing the risk of scratching the ceramic part. The first lateral pivot guide may be arranged on the internal side of the first support element, preferably on the first lower lateral structure.

In preferred embodiments, the manual ceramic cutter may further comprise a second longitudinal guide horizontally arranged along the first horizontal direction and being parallel to the first longitudinal guide. The second longitudinal guide may comprise a first longitudinal guide element, or a first and a second longitudinal guide elements. The guided carriage may further comprise a second support element movably coupled to the second longitudinal guide of the manual ceramic cutter for guiding a movement of the guided carriage in the first horizontal direction. The second support element is compatible with all the technical features already described for the first support element. Thus, the main body assembly may be connected to the second support element by means of a second main body articulation, wherein the second main body articulation may be configured such that the main body assembly can rotate with respect to the second lateral support around the main body axis transversally arranged with respect to both the first direction and the first horizontal direction. The second main body articulation may be arranged on the internal side of the first support element, i.e. the side of the support element facing the levering structure, and may be configured as a circular or cylindrical bearing designed for the insertion of the ends of the main body axis. The second support element may be configured as a slidable bearing having a main tubular structure attachable and slidable with respect to the second longitudinal guide of the guided carriage, in particular with respect to the first longitudinal guide element of the second longitudinal guide. According to some embodiments, the second support element may further comprise a respective second lower structure, arranged below the slidable bearing. In some embodiments, the second lower structure may be configured as an edge structure configured to be attachable and slidable with respect to a second longitudinal guide element of the second longitudinal guide.

In some preferred embodiments, the second support element may preferably further comprise a second lateral pivot guide connectable to the at least one contact pivot shaft, so that the at least one contact pivot shaft may be displaceable along the second pivot lateral guide. Preferably, the second lateral pivot guide may be vertically arranged. This provides the technical advantage of ensuring a more progressive movement and allowing an improved control over the position of the breaking tool along the first horizontal direction when performing a breaking operation, as already described for the first support element. The second lateral pivot guide may be arranged on the internal side of the second support element, preferably on the second lower lateral structure.

An advantage of having a guided carriage with a first and a second support elements is that the force may be distributed evenly between the two supports, thus providing a balanced and smooth movement of the main body with respect to the first and second support elements.

In preferred embodiments having a first and a second support element, the main body assembly and the actuator element of the leverage structure are arranged in a central position, i.e. between the first and the second support elements. In this configuration, the support elements are arranged as lateral support elements, while the elements forming the leverage structure are arranged as central parts of the guided carriage.

In some embodiments, the main body axis may be arranged to be coincident with the second axis, also identified in this configuration as main pivot shaft. Thus, a single axis may allow the articulation of the actuator element with respect to the first body structure, and the articulation of the main body assembly with respect to the first and second support elements, respectively.

BRIEF DESCRIPTION OF THE FIGURES

FIG. 6 illustrates a cutaway view of a guided carriage comprising a levering structure for a ceramic cutter device according to embodiments of the invention, wherein FIGS. 6a to 6c illustrate different positions for the actuator element of the levering structure.

DESCRIPTION OF PREFERRED EMBODIMENTS OF THE INVENTION

Figure 1:
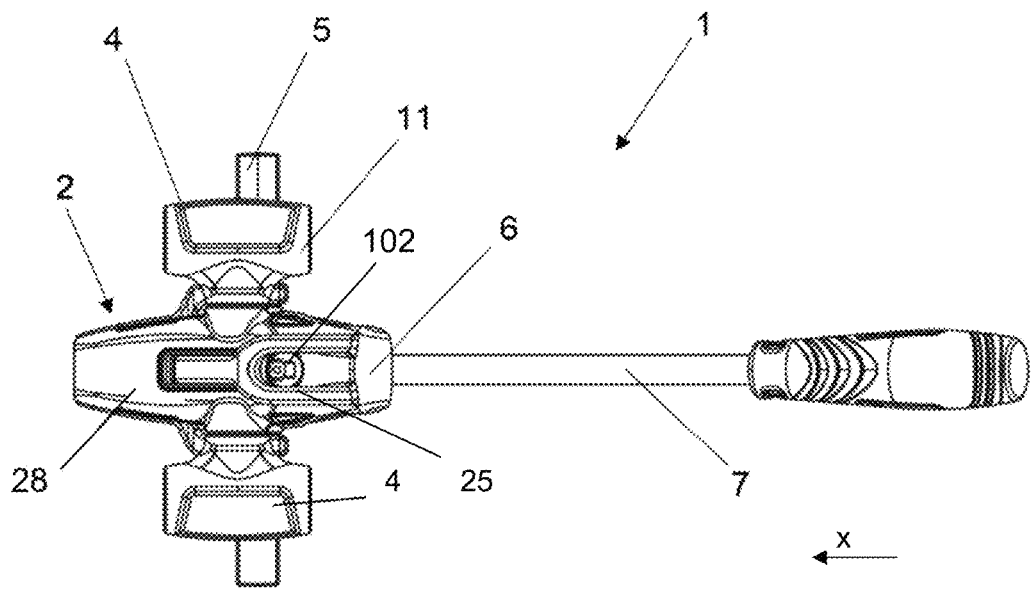
FIG. 1 illustrates a top view of a guided carriage comprising a levering structure for a ceramic cutter device according to embodiments of the invention.

FIG. 1 illustrates a top view of a guided carriage 1 comprising a levering structure for a ceramic cutter device according to embodiments of the invention. The guided carriage 1 shown in FIG. 1 comprises a levering structure and supported by a first 4 and a second 4 lateral supports. As the FIG. 1 shows a top view, the only visible parts of the levering structure are the upper part of a first body structure 28 of the main body assembly 2, an actuator element 6, a lever element 7 a breaking tool 5 and a proximal end 102 of a cutting tool 10. The first body structure comprises a first end portion and a second end portion, and longitudinally extends along a first direction. The first direction extends at least partially along a first horizontal direction, which in the top view represented in FIG. 1 corresponds to direction "x".

In FIG. 1 only an upper end portion of the actuator element 6 is visible. This upper end portion comprises an elongated contact body 25 extending from a second articulation, which is not visible in FIG. 1, and is arranged above the rear end portion of the first body structure 28. The elongated contact body depicted in FIG. 1 further comprises two elongated arms, arranged in parallel, and connected to each other at their respective ends by means of a contact element 26. However, the embodiment shown in FIG. 1 is compatible with other configurations for the actuator element 6 defined in the description.

The first 4 and second 4 support elements of FIG. 1 respectively comprise a respective main tubular structure 11 configured to be attached to a respective longitudinal guide of a manual ceramic cutter device. Each main tubular structure 11 may further comprise slide bearings. However, the embodiment of FIG. 1 is also compatible with other types of sliding mechanisms instead of the shown main tubular structures, as for example wheels' assemblies comprising a plurality of wheels having concave contact surfaces to contact with the longitudinal guides, wherein some wheels can be arranged over and some other wheels can be arranged under the longitudinal guides to ensure a controlled guided movement.

Figure 2:
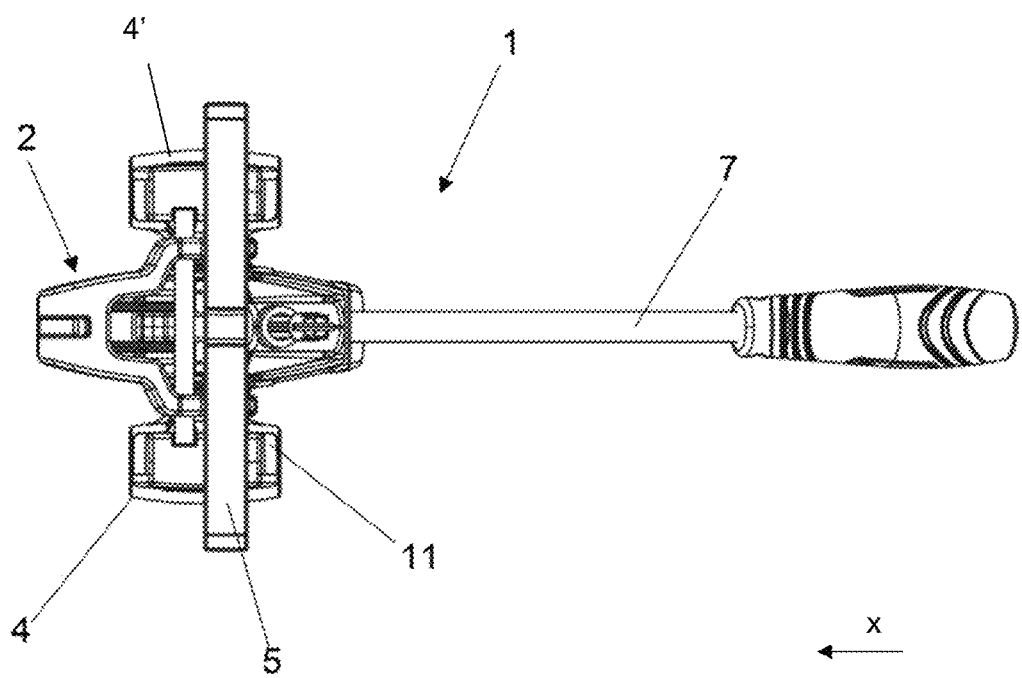
FIG. 2 illustrates a bottom view of a guided carriage comprising a levering structure for a ceramic cutter device according to embodiments of the invention.

FIG. 2 illustrates a bottom view of the guided carriage 1 of FIG. 1. The breaking tool 5 shown in FIG. 2 comprises an elongated body transversally arranged with respect to the first direction, and comprises two contact zones to be pressed against the ceramic part to be broken. The two contact zones are arranged along the elongated body and they are spaced apart by a distance. This distance covers the position of the cutting tool, which is equidistantly positioned with respect to both contact zones.

Figure 3:
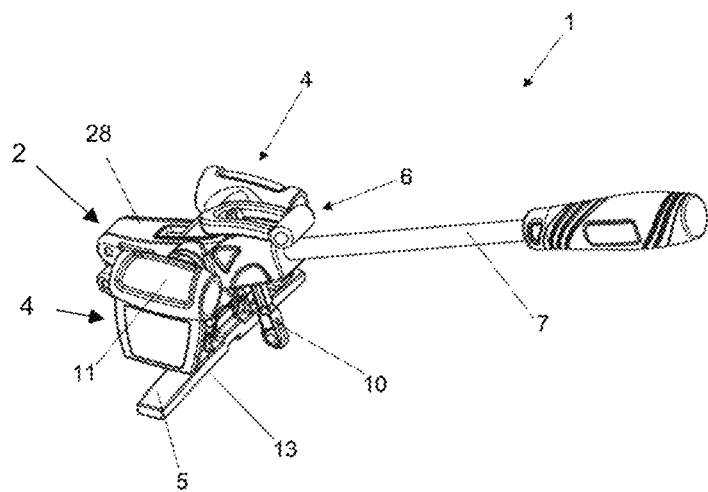
FIG. 3 illustrates a top-rear isometric view of a guided carriage comprising a levering structure for a ceramic cutter device according to embodiments of the invention.

FIG. 3 illustrates a top-rear isometric view of a guided carriage 1 comprising a levering structure for a ceramic cutter device according to embodiments of the invention. The first 4 and second 4 support elements of FIG. 3 comprise a respective main tubular structure and a respective lower structure 13.

FIG. 3 also illustrates a particular configuration where the distal end 101 of the cutting tool 10 protrudes through the space between the two elongated arms forming the upper end portion of the actuator element 6.

Figure 4:
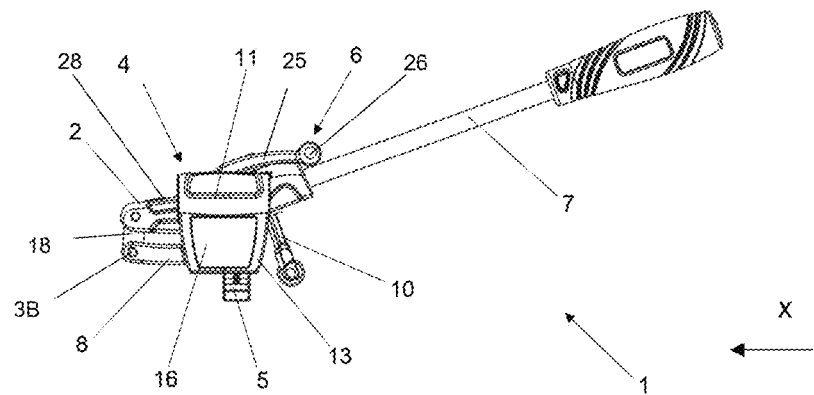
FIG. 4 illustrates a side view of a guided carriage comprising a levering structure for a ceramic cutter device according to embodiments of the invention.

FIG. 4 illustrates a side view of the guided carriage 1 comprising a levering structure for a ceramic cutter device according to the invention. In this embodiment, the second body structure of the main body assembly 2 comprises a first body structure element 8 having respective front and rear end portions, and a second body structure element 18 having respective upper and lower end portions. The lower end portion of the second body structure 18 element and the front end portion of the first body structure element 8 are pivotably connected to each other by means of a third articulation, such that the first body structure element 8 can pivot/swivel with respect to the second body structure element 18 around a third axis 3B transversally arranged with respect to the first direction.

FIG. 4 also shows a particular configuration of the upper end portion of the actuator element wherein the elongated contact body is curved downwards, i.e. is curved towards the lever element 7. In this particular configuration, as shown in FIG. 4, the elongated contact body is configured such that, when the first body structure 28 is pivoted/swiveled from a first pivoting end position to a second pivoting end position, the pivoting movement of the first body structure 28 causes the lever element 7 to push the contact body 26, so that the actuator element 6 is moved from a first leverage position to a second leverage position. However, in some alternative configurations having a shorter elongated body, the contact body 26 may be pushed by the first body structure 28 and/or the lever element 7.

Figure 5:
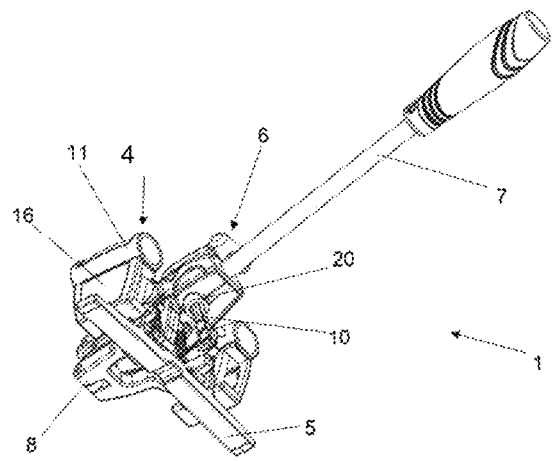
FIG. 5 illustrates a bottom-rear isometric view of a guided carriage comprising a levering structure for a ceramic cutter device according to embodiments of the invention.

FIG. 5 illustrates a bottom-rear isometric view of the guided carriage 1 of FIG. 4. The first body structure element 8 shown in FIG. 5 comprises a forked section having a first arm and a second arm. Although not visible in FIG. 5, at least one contact pivot shaft may connect the first and the second arms of the first body structure element. Alternatively, a first contact pivot shaft may be connected to the first arm, and a second pivot shaft may be connected to the second arm, wherein preferably both contact pivot shafts are aligned collinearly one in relation to the other.

Figure 6:
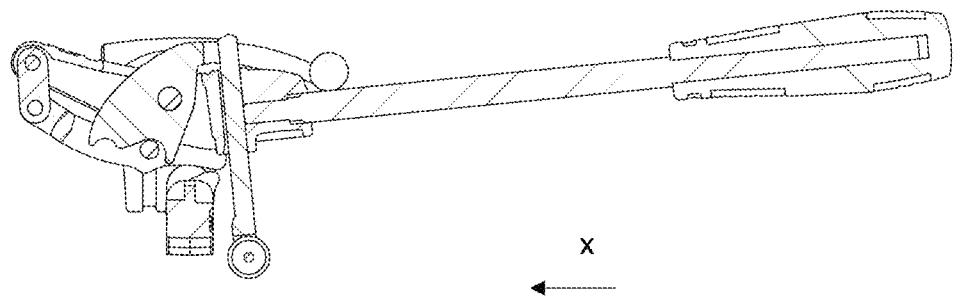
Figure 6:
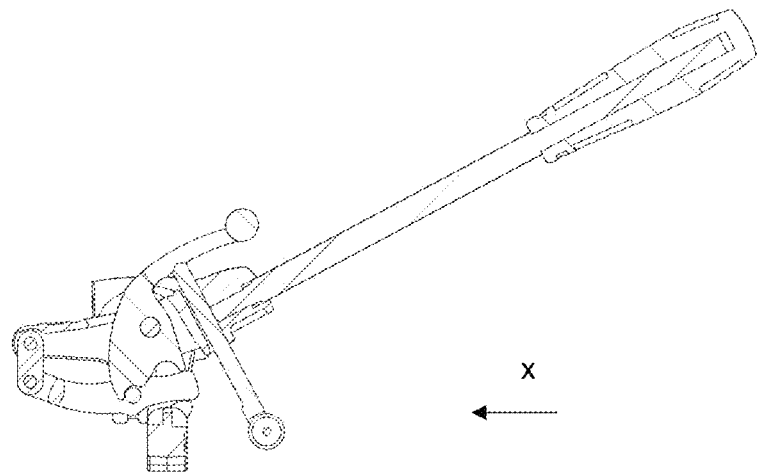
Figure 6:
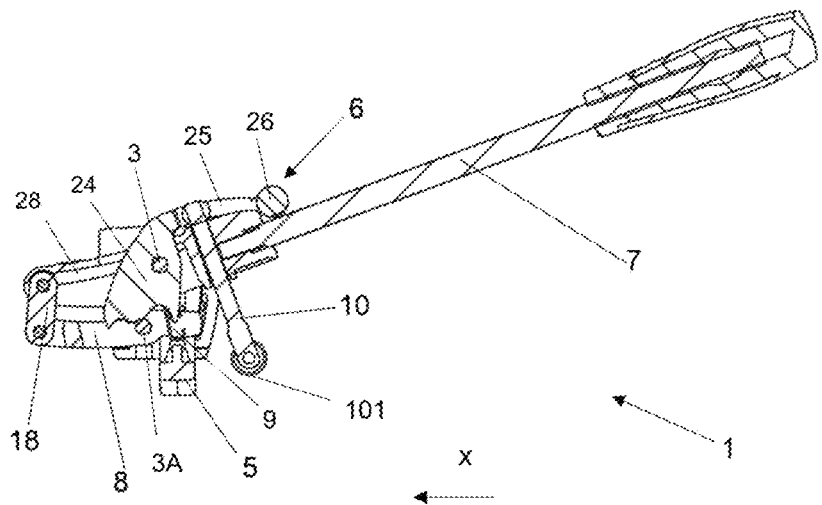

FIG. 6 illustrates a cutaway view of the guided carriage 1 of FIGS. 4 and 5. FIGS. 6a to 6c show a levering structure according to the invention comprising a main body assembly 2 configured as a trapezoid structure comprising an actuator element 6, a first body structure 28 and a second body structure, wherein the second body structure comprises a first body structure element 8 and a second body structure element 18. As it can be seen, the actuator element 6 has a lower section and an upper section, and is pivotably connected to the first body structure 28 by means of a second articulation, such that the actuator element 6 can pivot/swivel with respect to the first body structure 28 around a second axis 3 transversally arranged with respect to the first direction. The lower section of the actuator element 6 comprises a lower end portion comprising a curvilinear base having a first concave portion and a second concave portion. The lower section of the actuator element 6 is configured as a flat block 24 with a substantially triangular outline.

FIGS. 6a to 6c illustrate a cutting tool 10 and a breaking tool 5. The cutting tool is connected to the first body structure 28 by means of a first coupling mechanism. The first body structure element 18 of the second body structure comprises a contact pivot shaft 3A transversally arranged with respect to the first direction, and the rear end portion of the second body structure comprises a second coupling mechanism, where the breaking tool 5 is connected. FIGS. 6a to 6c partially show a bias element 9, configured for biasing/pretensioning the lower end portion of the actuator element 6 against the contact pivot shaft 3A such that the curvilinear base of the actuator element 6 remains in contact with the contact pivot shaft 3A. The bias element 9 is an elongated elastic element, in particular configured as a helical spring. Although only one bias element is partially visible in FIG. 6, this embodiment comprises two identical bias element arranged in parallel, as it can be seen in FIG. 5.

The embodiment of FIGS. 6a to 6c only show a first support element 4, as it is a cutaway view. However, the embodiment comprises a second support element 4, which is not visible. The first and second support elements comprise respective first and second lateral pivot guides 33, vertically arranged. Only the first lateral pivot guide 33 is partially visible. The contact pivot shaft 3A has respective first and second end portions, wherein the first end portion is connected to the first lateral pivot guide 33, and the second end portion is connected to the second lateral pivot guide 33. Thus, the contact pivot shaft is vertically movable along the lateral pivot guides 33. FIGS. 6a to 6c show a lever element 7 configured as a lever bar that is attached to the rear end portion of the first body structure 28 by means of a third coupling mechanism. The third coupling mechanism may be configured, for example, as a threaded hole arranged on the rear end of the first body structure.

FIG. 6a illustrates, in particular, the levering structure being positioned in a scoring position. The scoring position shown in FIG. 6a is defined by the fact that the first body structure 28 is arranged in a first pivoting end position, and simultaneously the first concave position of the actuator element 6 is resting on the contact pivot shaft 3A in a first leverage position. As it can be seen, when the leverage structure is the scoring position, the distal end 101 of the cutting tool 10 is arranged below the breaking tool 5, such that the cutting tool 10 can reach a ceramic part horizontally arranged below the guided carriage 1, without the breaking tool 5 reaching said ceramic part. In FIG. 6a the lever element 7 has an inclination angle with respect to the first horizontal direction "x" of approximately 6 degrees. However, in other embodiments this angle may be in the range between 5 and 20 degrees, being 15 degrees a preferred ergonomic value. However, the thickness of the ceramic part to be broken may affect the value of this angle, as the position of the cutting tool would adapt to the exact thickness of the ceramic part. The first coupling mechanism may be configured for allowing and adjustment of the position of the proximal end of the cutting tool, thus allowing a customization of said angle. In the specific embodiment depicted in FIG. 6a, the contact element 26 of the actuator element 6 is configured to be in contact with the lever element 7 when the levering structure is in the scoring position. However, in some alternative embodiments, the contact element 26 may be configured to be in contact with the first body structure 28 and/or the lever element 7 when the levering structure is in the scoring position.

FIG. 6b illustrates, in particular, the levering structure being positioned in a breaking position. The breaking position shown in FIG. 6b is defined by the fact that the first body structure 28 is arranged in a second pivoting end position, and simultaneously the second concave position of the actuator element 6 is resting on the contact pivot shaft 3A in a second leverage position. As it can be seen, when the leverage structure is the breaking position, the distal end 101 of the cutting tool 10 is arranged over the breaking tool 5, such that the breaking tool 5 can reach a ceramic part horizontally arranged below the guided carriage 1, without the distal end of the cutting tool 5 reaching said ceramic part. In FIG. 6b the lever element 7 has an inclination angle with respect to the first horizontal direction "x" of approximately 28 degrees. However, in other embodiments this angle may be in the range between 20 and 30 degrees, being 23 degrees a preferred ergonomic value.

FIG. 6c illustrates, in particular, the levering structure being positioned between the scoring position and the breaking position. The position shown in FIG. 6c is defined by the fact that the first body structure 28 is arranged in an intermediate position between the first and the second pivoting end positions, and simultaneously the actuator element 6 is in an intermediate position between the first and second leverage positions. In this position, the cutting tool 10 is arranged at a higher position than when the leverage structure is in the scoring position. Additionally, the breaking tool 5 is arranged at a higher position than when the leverage structure is in the breaking position. Therefore, the cutting tool 10 and the breaking tool 5 are arranged at a distance from said ceramic part. Moreover, as it can be seen, the curvilinear base has a smooth profile continuously and smoothly connecting the first and second concave regions.

The levering structure of FIGS. 6a to 6c is configured for transitioning from the scoring position to the breaking position by pushing upwards the lever element 7. Thus, when the lever element 7 is pushed upwards, then the contact element 26 is pushed also upwards so that actuator element 6 is moved from the first leverage position to the second leverage position. In the embodiment depicted in FIGS. 6a to 6c, the actuator element is configured such that the transition from the first leverage position to the second leverage position concludes when the lever element reaches an angle of approximately 45 degrees with respect to the first horizontal direction. Thus, the user can keep his hand on the lever element and, in particular, can keep his hand on the lever with the palm of the hand facing down both when the levering structure is in the scoring position and in the breaking position, and also when transitioning from the first to the second leverage positions. This is advantageous because the standard work flow followed when using this kind of devices comprises: positioning a ceramic part, scoring the ceramic part, breaking the ceramic part and, finally, replace the already broken ceramic part by another one to be broken. Therefore, the user does not need to remove his hands from the levering structure during the standard work flow. In order to return from the breaking position to the scoring position, the elongated body 25 of the actuator element 6 has to be manually pressed downwards.

Figure 7:
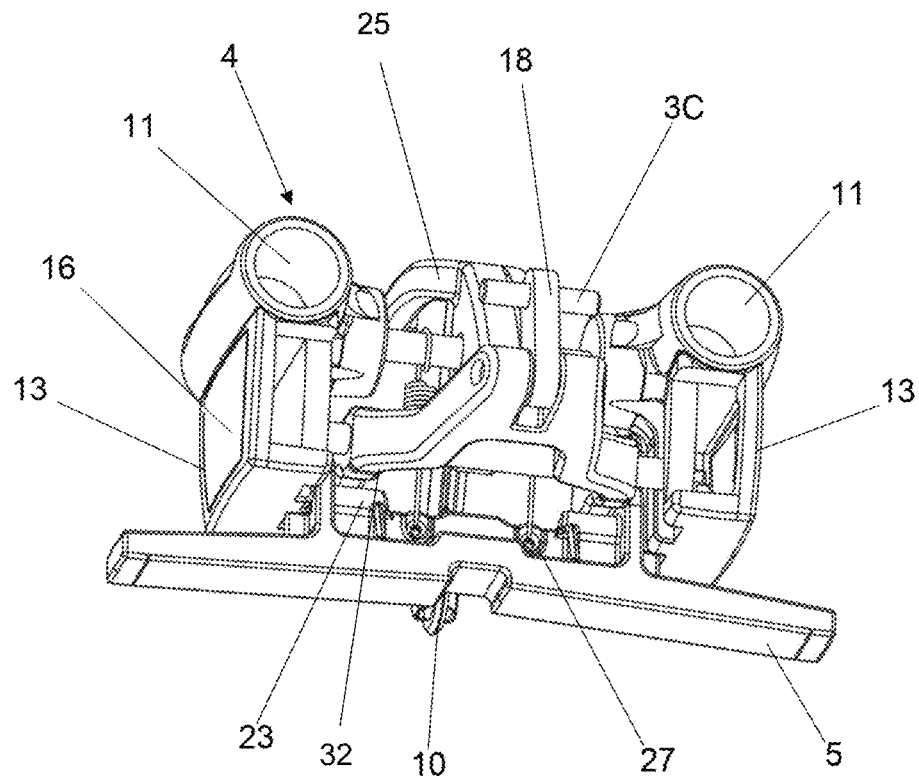
FIG. 7 illustrates bottom-front isometric views of two configurations of a guided carriage for a ceramic cutter device according to related embodiments of the invention. The guided carriages of FIGS. 7a and 7b are shown without its respective first body structure and its respective lever element.
Figure 7:
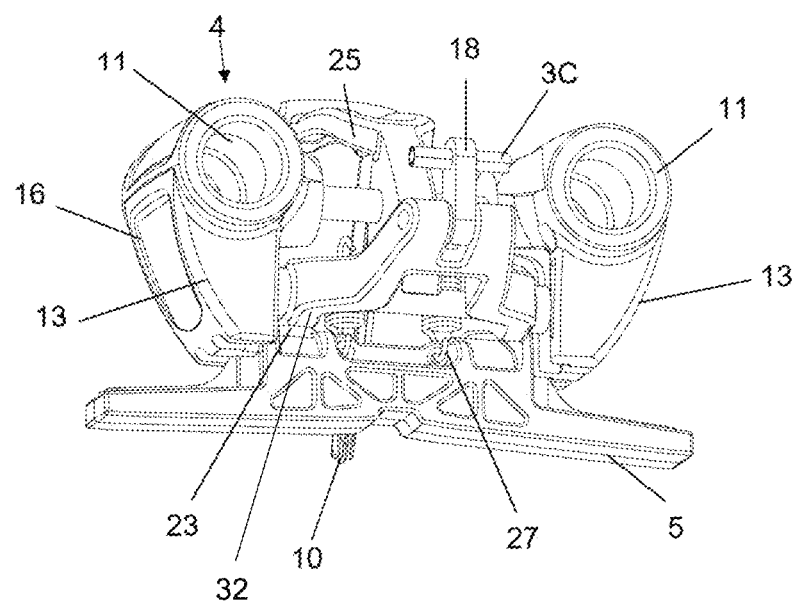

FIG. 7 illustrates bottom-front isometric views of two configurations of a guided carriage 1 for a ceramic cutter device according to related embodiments of the invention. The guided carriages of FIGS. 7a and 7b are shown without its respective first body structure and its respective lever element. FIGS. 7a and 7b illustrate that the two bias elements 9 of the two embodiments comprise respective first and second end portions. FIG. 7a shows the respective first end portions of the bias elements 9 as pivotably connected to the the second axis 3, such that the bias element 9 can pivot/swivel with respect to the first body structure 28 around the second axis 3. Although not visible in FIG. 7b, the respective first portions of the bias elements shown in FIG. 7b are connected, preferably pivotably connected, to the first body structure element 28 of the first body structure. In the embodiments depicted in FIGS. 7a and 7b, the respective second end portions are connected to respective connector holes 27 located on the breaking tool 5. Although this embodiment is compatible with other configurations for the coupling mechanism previously described, FIGS. 7a and 7b illustrate the second coupling mechanism of the second body structure configured as two contact bases 32 located on a lower end portion of the rear end portion of the second body structure. In particular, a first contact base 32 is located on the first arm of the forked section, while a second contact base 32 is located on the second arm of the forked section. Said contact bases 32 are configured to be in contact with two contact components 23 of the breaking tool, both configured as respective cylindrical pins transversally arranged with respect to the first direction. The cylindrical pins are kept in contact with the contact base as a result of the force provided by the bias element.

The contact bases 32 extend longitudinally between a first end position, arranged closer to the contact pivot shaft, and a second end position, arranged closer to the second end portion of the second body structure. Additionally, the biasing elements 9 may be further configured to provide a biasing/pretensioning force to pull the breaking tool towards the first end position contact base.

The two embodiments of FIGS. 7a and 7b comprise respective first and second support elements 4, each support element comprising a respective main tubular structure 11. The support elements 4 of the embodiment of FIG. 7a additionally comprise respective lower structures 13. Each main tubular structure 11 of FIGS. 7a and 7b is configured to be attachable and slidable with respect to a respective longitudinal guide of a ceramic cutter device, in particular with respect to a first longitudinal guide element of the said respective longitudinal guide. The difference between both embodiments is that each respective lower structures 13 of the supports elements of FIG. 7a is further configured as a respective edge structure configured to be attachable and slidable with respect to a respective second longitudinal guide element of said respective longitudinal guide.

Figure 8:
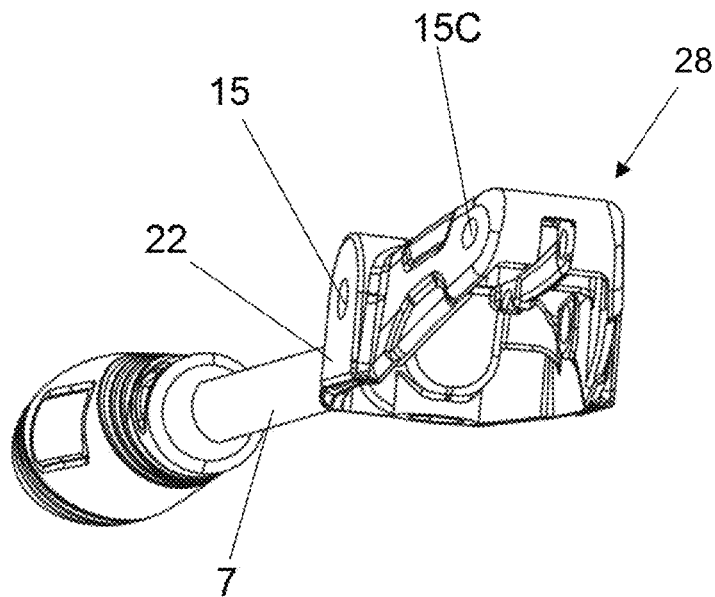
FIG. 8a illustrates a bottom-front isometric view of an assembly of a first body structure and a lever element of a guided carriage for a ceramic cutter device according to embodiments of the invention.
FIG. 8b shows a complementary view of the same first body structure. The embodiment depicted in FIGS. 8a and 8b is compatible with the configurations shown in both FIGS. 7a and 7b.
Figure 8:
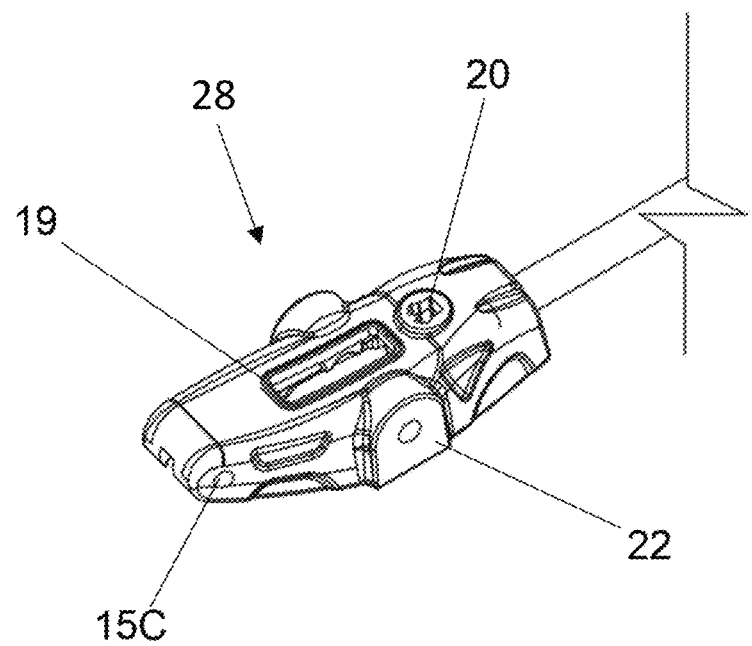

FIG. 8a illustrates a first body structure 28 and a lever element 7, wherein the first body structure 28 comprises a front 15C and rear 15 through holes for respectively inserting the first axis 3C and the second axis 3. The rear end portion of the first body structure 28 comprises, in the lateral walls and around the rear through holes, respective substantially flat surfaces 22. FIG. 8b shows a complementary view of the same first body structure 28. The configuration shown in FIGS. 8a and 8b is compatible with the two embodiments respectively shown in FIGS. 7a and 7b.

Figure 12:
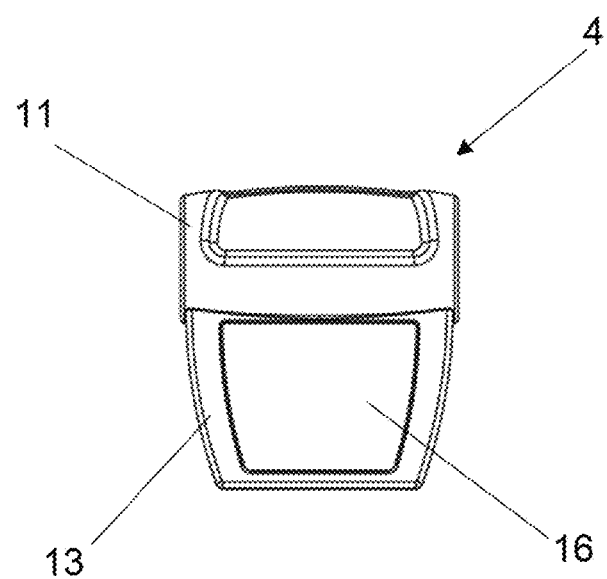
FIG. 12 illustrates a side view of a support element for a guided carriage comprising a levering structure for a ceramic cutter device according to embodiments of the invention.

The first body structure 28 of FIG. 8b comprises an elongated and longitudinally arranged through hole 19 on the central face of its U-shaped longitudinal profile. This through hole 19 is configured for receiving the actuator element 6, such that when the actuator element pivots/swivel with respect to the first body structure 28 around the second axis, the through hole 19 provides end limits to the maximum amplitude of the pivoting movement of the actuator element 6. The first coupling mechanism shown in FIG. 12 is configured as a through-socket 20, where the cutting tool 10 is attached by insertion.

FIGS. 9a and 10a illustrate different views of the guided carriage 1 of FIG. 7a shown without one of its support elements and without its first body structure. FIGS. 9b and 10b illustrate different views of the guided carriage 1 of FIG. 7b shown without one of its support elements and without its first body structure.

In the embodiment shown in FIGS. 9b and 10b, the respective first portions of the bias elements 9 are directly connected to the first body structure 28. This configuration is specifically compatible with the embodiment shown in FIG. 7b. Although other configurations are compatible, FIG.

9b illustrates the first body structure as comprising respective through holes to receive the respective first end portions of the bias elements 9, which are configured as an exemplary embodiment as respective hooked portions.

Figure 9:
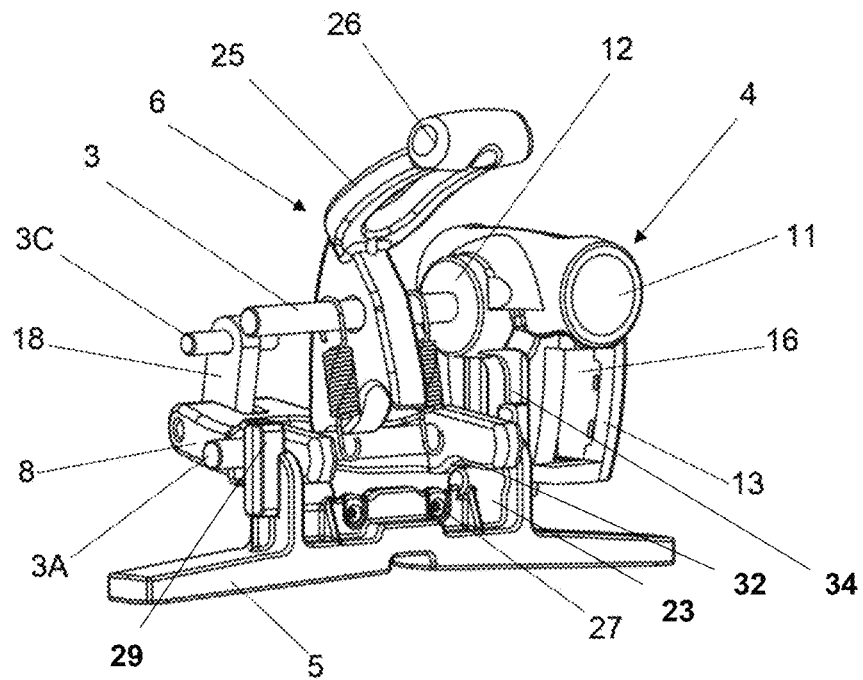
FIG. 9 illustrates a top-rear isometric view of a guided carriage for a ceramic cutter device according to embodiments of the invention, wherein the guided carriage is shown without one of its support elements and without its first body structure.
Figure 9:
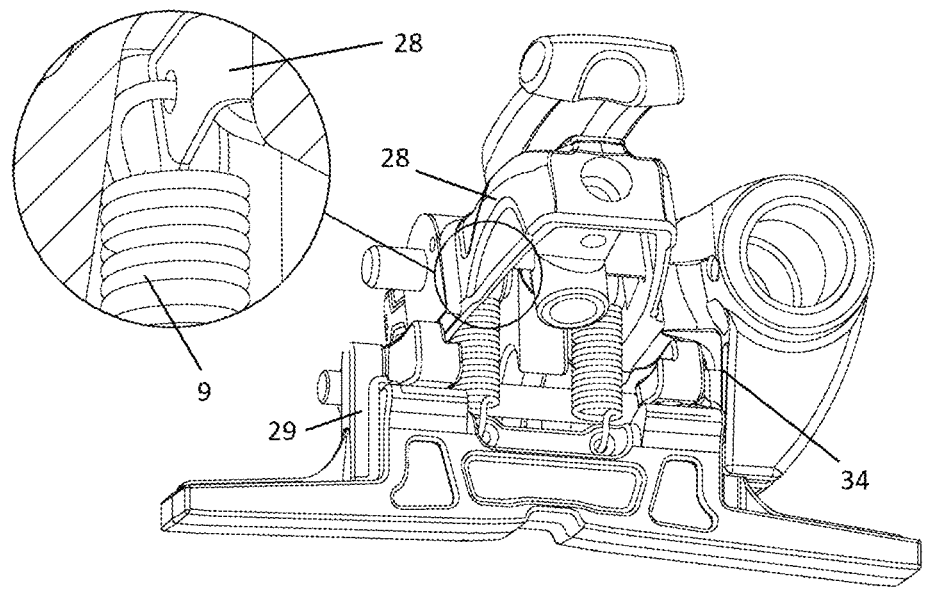
Figure 10:
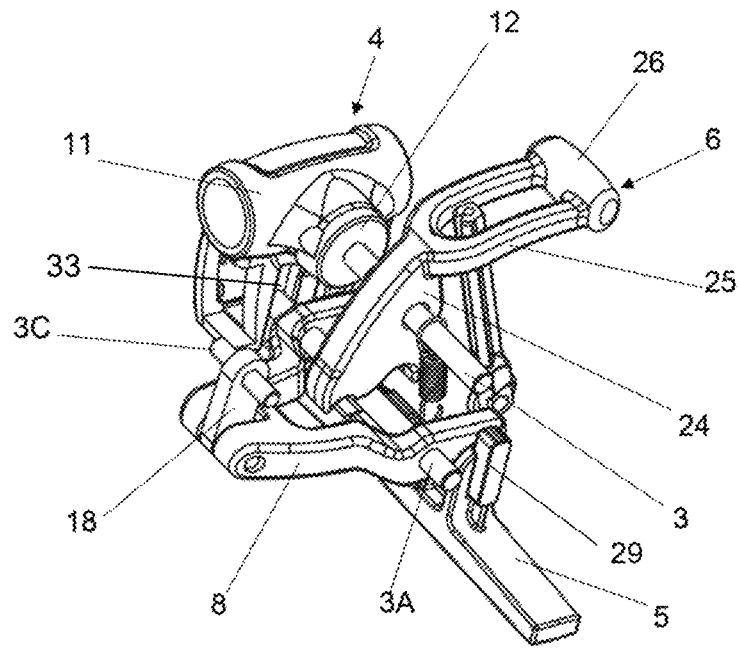
FIG. 10 illustrates a top-front isometric view of the same guided carriage shown in FIG. 9.
Figure 10:
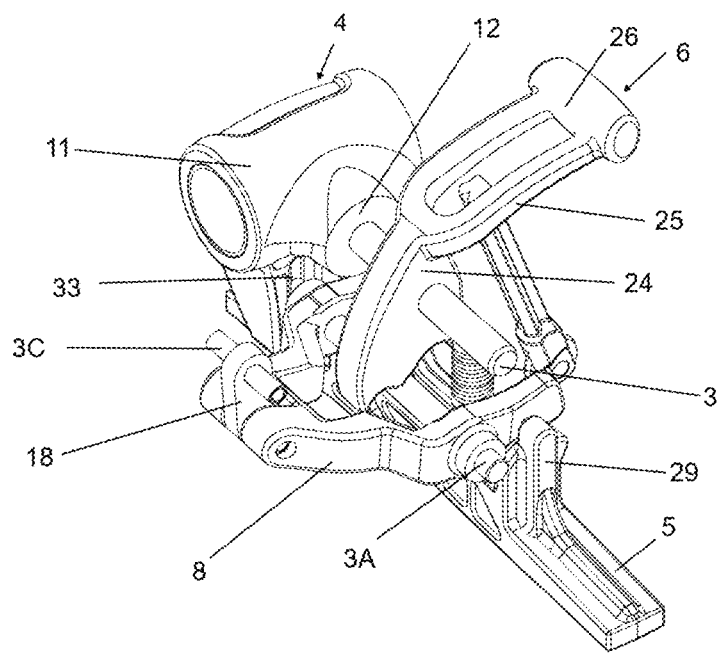

In all the embodiments shown in FIGS. 9 and 10, each support element 4 comprises a respective lateral pivot guide 33 connected to contact pivot shaft 3A, so that the contact pivot shaft 3A is displaceable along the first lateral pivot guide. In the embodiments shown in FIGS. 9 and 10, the first lateral pivot guides 33 are vertically arranged.

In all the embodiments shown in FIGS. 9 and 10, the breaking tool further comprises optional extensible means 29 configured to allow a guided rectilinear and vertical displacement of the breaking tool with respect to the second coupling mechanism. In these particular embodiments, each support element 4 further comprises a lateral tool guide 34, vertically arranged, and configured for receiving the extensible means 29, thus allowing an additional guided linear movement of the breaking tool with respect to the support elements 4. In some embodiments compatible with the invention, the lateral tool guides 34 may guide directly the breaking tool 5, instead of guiding the extensible means 29. For example, a pin or de like may be arranged on the breaking tool to be guided by the lateral tool guide.

Figure 11:
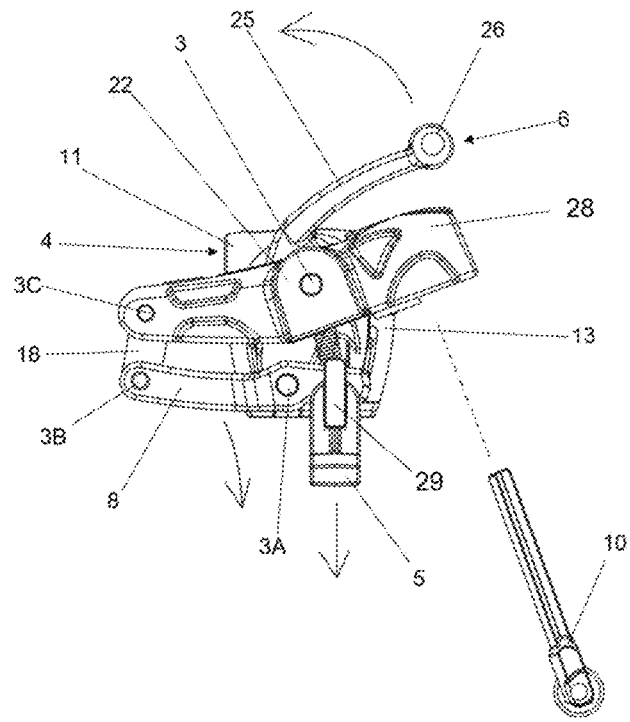
FIG. 11 illustrates a side view of a guided carriage comprising a levering structure for a ceramic cutter device according to embodiments of the invention.

FIG. 11 shows the trapezoid structure formed by the different parts of the main body assembly. FIG. 11 also shows a triangular structure formed by the bias element, the leverage distance between the first end portion of the bias element and the contact pivot shaft 3A, and the leverage distance between the contact pivot shaft 3A and the second end portion of the bias element.

FIG. 12 illustrates a side view of a support element 4 for a guided carriage 1 comprising a levering structure for a ceramic cutter device according to embodiments of the invention.

Figure 13:
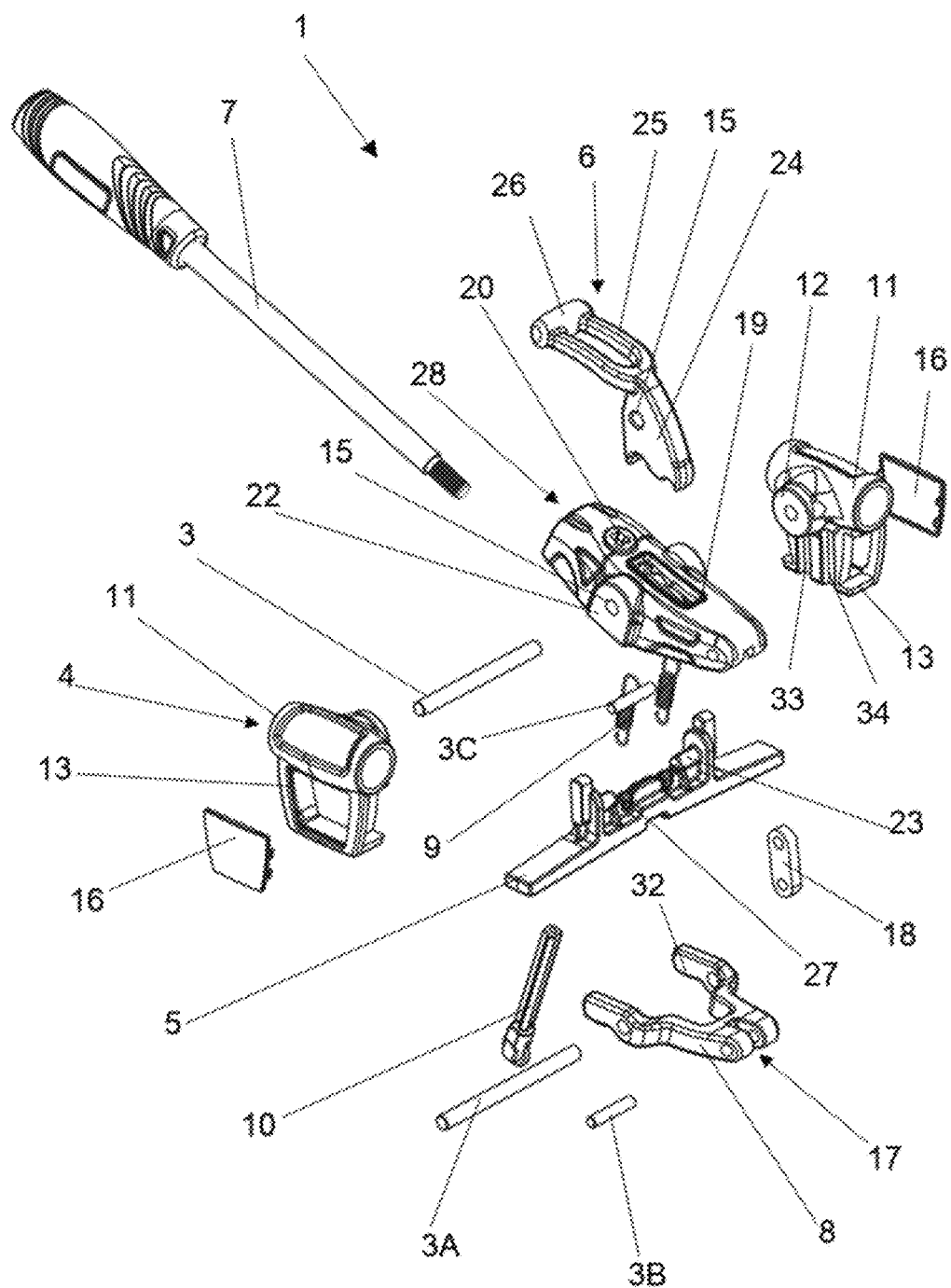
FIG. 13 illustrates an exploded top-front isometric view of a guided carriage comprising a levering structure for a ceramic cutter device according to embodiments of the invention.
Figure 14:
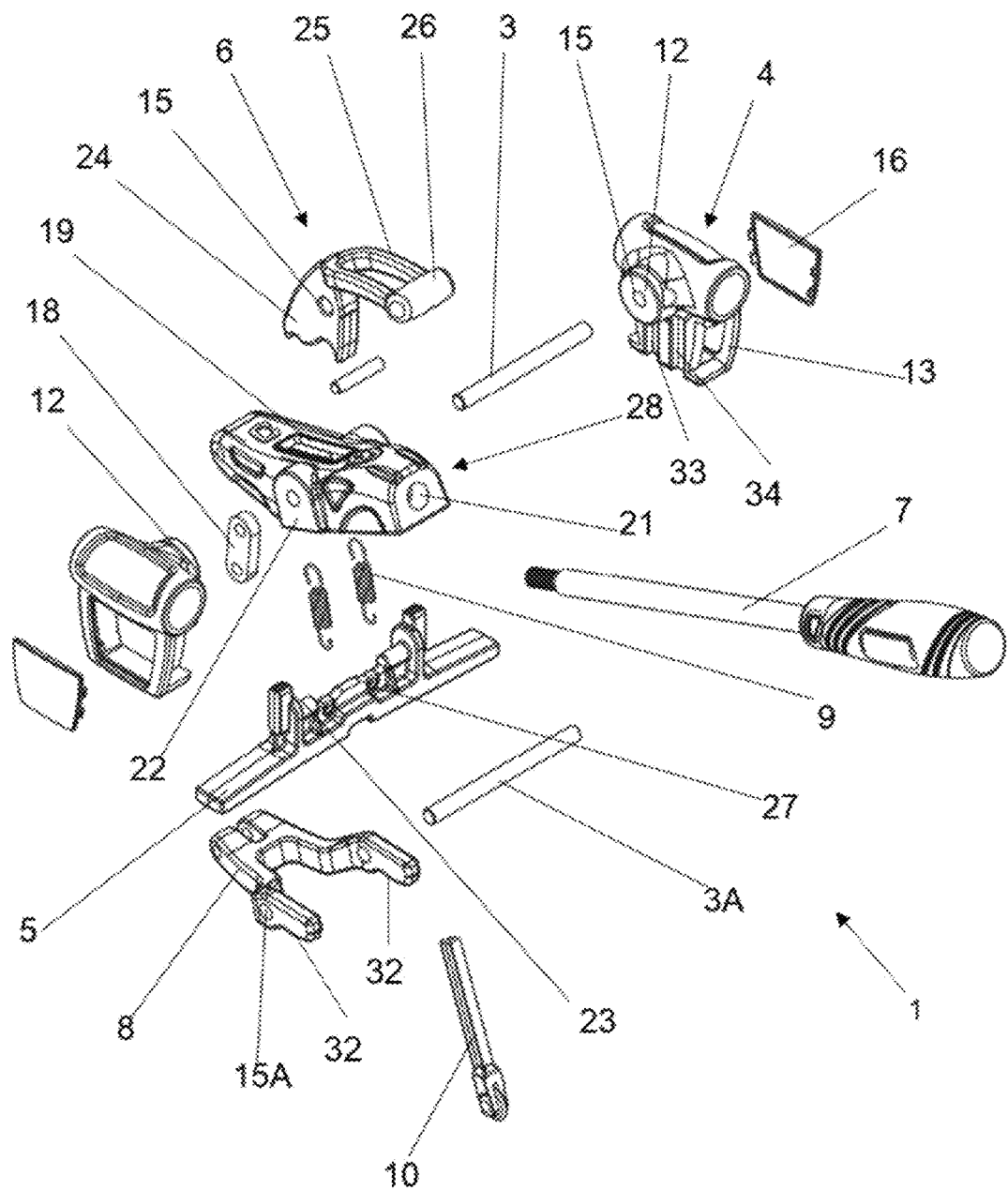
FIG. 14 illustrates an exploded top-rear isometric view of a guided carriage comprising a levering structure for a ceramic cutter device according to embodiments of the invention.

FIGS. 13 and 14 illustrates an exploded top-front isometric view of a guided carriage 1 comprising a levering structure for a ceramic cutter device according to embodiments of the invention. The bias elements shown in FIGS. 13 and 14 are compatible with any connection configuration previously described. FIGS. 13 and 14 show a first body structure element 8 having a socket recess 17 for the insertion of the lower end portion of a short second body structure element 18 vertically arranged.

FIGS. 13 and 14 also depict that each support element 4 further comprise, in a lower vertical position of its respective internal face with respect to the circular or cylindrical bearing 11, a lower structure 13, which comprises a lateral pivot guide 33 and a lateral tool guide 34 in an internal side, i.e. the lateral side facing the main body assembly. The lateral pivot guide 33 is configured for receiving the contact pivot shaft 3A that traverses the forked section of the second body structure element 8 via through holes 15A, so that the contact pivot shaft can oscillate along the length of the lateral pivot guide 33 from a top position to a bottom position and vice versa. The lateral tool guide 34 is configured for receiving the breaking tool, in particular, a pin of the breaking toll or the extensible means. The lateral pivot guide 33 and the lateral tool guide 34 may be configured as respective cut-outs. The external side of each support element, i.e. the side which is facing outside instead of being facing the central levering structure, comprises an opening relative to the edges, wherein the opening is covered by a lid 16, in particular a flat square polymeric lid.

In FIGS. 13 and 14, the main body assembly 2 is connected to the first support element 4 by means of a first main body articulation, wherein the first main body articulation is configured such that the main body assembly can rotate with respect to the first lateral support 4 around a main body axis 3 transversally arranged with respect to both the first direction and the first horizontal direction. The main body assembly 2 is also connected to the second support element 4 by means of a second main body articulation 12, wherein the second main body articulation may be configured such that the main body assembly 2 can rotate with respect to the second lateral support 4 around the main body axis 3. The first and second main body articulations 12 are respectively arranged on the respective internal side of the respective support element. The first and second main body articulations 12 are configured as a circular or cylindrical bearing designed for the insertion of the ends of the main body axis 3.in this particular embodiment, the main body axis is coincident with the second axis 3.

FIG. 14 shows the third coupling mechanism for attaching the lever element 7 to the first body structure 28, wherein said coupling mechanism is configured as a threaded hole 21. The rear end portion of the first body structure 28 has a transversally arranged closing wall, which closes the substantially U-shaped cross-section of the first body structure 28. The first coupling mechanism is arranged in said closing wall.

Figure 15:
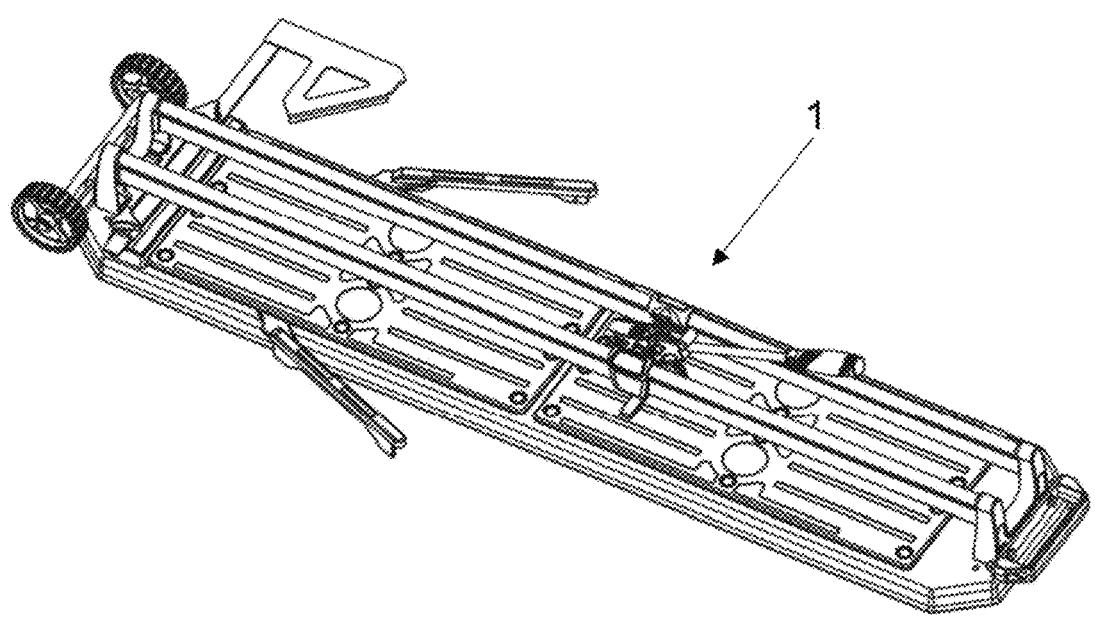
FIG. 15 illustrates a top-rear isometric view of a ceramic cutter device comprising a guided carriage with a levering structure according to embodiments of the invention.

FIG. 15 illustrates a top-rear isometric view of a manual ceramic cutter device comprising a guided carriage 1 with a levering structure according to embodiments of the invention. The manual ceramic cutter device comprises a first and a second longitudinal guides horizontally arranged along the first horizontal direction. The first support element of the guided carriage 1 is movably coupled to the first longitudinal guide of the manual ceramic cutter for guiding a movement of the guided carriage 1 in the first horizontal direction. The second support element of the guided carriage 1 is movably coupled to the second longitudinal guide of the manual ceramic cutter for guiding a movement of the guided carriage 1 in the first horizontal direction. Additionally, the manual ceramic cutter device of FIG. 15 shows a horizontally arranged platform for positioning the ceramic parts to be broken.

The invention claimed is:

1. A levering mechanism for a ceramic cutting and breaking device, the levering mechanism comprising:
   a main body assembly comprising:
   a first body structure and a second body structure having respective front and rear end portions, wherein the first body structure extends along a first direction;
   wherein the front end portions of the first and second body structures are pivotably connected to each other by a first articulation, such that the first body structure is pivotable with respect to the second structure around a first axis, transversally arranged with respect to the first direction, from a first pivoting end position towards a second pivoting end position;
   wherein the rear end portion of the first body structure comprises a first coupling mechanism configured for coupling a cutting tool; and
   wherein the second body structure comprises at least one contact pivot shaft transversally arranged with respect to the first direction, and wherein the rear end portion of the second body structure comprises a second coupling mechanism configured for coupling a breaking tool;
   an actuator element having a lower section and an upper section; wherein the actuator element is pivotably connected to the first body structure by a second articulation, such that the actuator element is pivotable with respect to the first body structure around a second axis transversally arranged with respect to the first direction;

wherein the lower section of the actuator element comprises a lower end portion having a curvilinear base comprising at least a first concave portion and a second concave portion, respectively configured to rest on the contact pivot shaft in a first leverage position and a second leverage position;

wherein the levering mechanism is configured such that, when the first body structure is pivoted from the first pivoting end position to the second pivoting end position, the pivoting movement of the first body structure causes the actuator element to move from the first leverage position to the second leverage position;

wherein a leverage distance between the first axis and a contact point of the curvilinear base with the contact pivot shaft is shorter in the second leverage position than in the first leverage position.

2. The levering mechanism according to claim 1, wherein the curvilinear base has a smooth profile continuously and smoothly connecting the first and second concave portions, wherein the first concave portion and the second concave portion are mutually separated by a first convex portion.

3. The levering mechanism according to claim 1, wherein the first coupling mechanism is arranged at a point between the front and rear end portions of the first body structure between the second articulation and the rear end portion of the first body structure.

4. The levering mechanism according to claim 1, wherein the upper section of the actuator element comprises an elongated contact body extending from the second articulation at least partially along the first direction, and wherein the elongated contact body is arranged at least partially above the rear end portion of the first body structure.

5. The levering mechanism according to claim 4, wherein the elongated contact body is curved downwards.

6. The levering mechanism structure according to claim 4, further comprising a lever element attached to the first body structure and configured for driving the pivoting movement of the first body structure; wherein the elongated contact body is configured such that, when the first body structure is pivoted from the first pivoting end position to the second pivoting end position, the pivoting movement of the first body structure causes the first body structure and/or the lever element to push the elongated contact body, so that the actuator element is moved from the first leverage position to the second leverage position.

7. The levering mechanism according to claim 6, wherein the elongated contact body of the actuator element comprises an upper end portion having a contact element.

8. The levering mechanism structure according to claim 7, wherein the elongated contact body is arranged such that, when the first body structure is pivoted from the first pivoting end position to the second pivoting end position, the pivoting movement of the first body structure causes the rear end of the first body structure and/or the lever element to push the contact element of the elongated contact body, so that the actuator element is moved from the first leverage position to the second leverage position.

9. The levering mechanism according to claim 1, further comprising a lever element attached to the first body structure and configured for driving the pivoting movement of the first body structure.

10. The levering mechanism according to claim 9, wherein the lever element is attached to the rear end portion of the first body structure by a third coupling mechanism.

11. The levering mechanism according to claim 1, further comprising:
a cutting tool for scoring a ceramic part, wherein the cutting tool is coupled to the first coupling mechanism, and
a breaking tool for breaking said ceramic part, wherein the breaking tool is connected to the second coupling mechanism;
wherein, when the actuator element is in the first leverage position and the first body structure is in the first pivoting end position, a distal end of the cutting tool is arranged below the breaking tool, such that the cutting tool can reach the ceramic part without the breaking tool reaching the ceramic part; and
wherein, when the actuator element is in the second leverage position and the first body structure is in the second pivoting end position, a distal end of the cutting tool is arranged over the breaking tool, such that the breaking tool can reach the ceramic part.

12. The levering mechanism according to claim 11, wherein, when the actuator element is in an intermediate position between the first and second leverage positions, and the first body structure is in an intermediate position between the first and second pivoting end positions, both the distal end of the cutting tool and the breaking tool are arranged at a distance of the ceramic part, such that they are prevented from reaching the ceramic part.

13. The levering mechanism according to claim 1, further comprising at least a bias element configured for biasing/pretensioning the lower end portion of the actuator element against the contact pivot shaft, such that the curvilinear base of the actuator element remains in contact with the contact pivot shaft while moving between the first leverage position and the second leverage position;
wherein the at least one bias element is an elongated elastic element comprising a first and a second end portions.

14. The levering mechanism according to claim 13, wherein:
the second end portion of the at least one bias element connected to the breaking tool;
the second coupling mechanism is configured as a contact base located on a lower end portion of the rear end portion of the second body structure;
the breaking tool further comprises at least one contact component configured to be in sliding contact with the contact base; and
the at least one bias element is further configured for biasing/pretensioning the breaking tool against the second body structure, such that at least a part of the contact base remains in contact with the at least one contact component.

15. The levering mechanism according to claim 1, wherein the breaking tool comprises at least one extensible means configured to allow a guided rectilinear displacement of the breaking tool with respect to second coupling mechanism.

16. The levering mechanism according to claim 1, wherein the second body structure further comprises a first body structure element having respective front and rear end portions, and a second body structure element;
wherein the first body structure element comprises the at least one contact pivot shaft; and
wherein the front end portion of the first body structure element and the lower end portion of the second body structure element are pivotably connected to each other by a third articulation, such that the first body structure element can pivot/swivel with respect to the second body structure element around a third axis transversally arranged with respect to the first direction.

17. The levering mechanism according to claim 1, wherein the second body structure or the second body structure element comprise a first arm and a second arm, configured as a fork, and wherein the contact pivot shaft connects the first and the second arms of the second structure body structure or the second body structure element.

18. A manual ceramic cutter with a guided carriage comprising a levering mechanism according to claim 1, the manual ceramic cutter being configured for receiving a ceramic part, wherein:
   the manual ceramic cutter comprises a first longitudinal guide horizontally arranged along a first horizontal direction;
   the guided carriage further comprises: a first support element movably coupled to the first longitudinal guide of the manual ceramic cutter for guiding a movement of the guided carriage in the first horizontal direction;
   the main body assembly is connected to the first support element by a first main body articulation, wherein the first main body articulation is configured such that the main body assembly can rotate with respect to the first lateral support around a main body axis transversally arranged with respect to the first direction and to the first horizontal direction; and
   the first support element further comprises a first lateral pivot guide connectable to the at least one contact pivot shaft, so that the at least one contact pivot shaft is displaceable along the first lateral guide.

19. The manual ceramic cutter according to claim 18, wherein:
   the manual ceramic cutter further comprises a second longitudinal guide horizontally arranged along the first horizontal direction;
   the guided carriage further comprises: a second support element movably coupled to the second longitudinal guide of the manual ceramic cutter for guiding a movement of the guided carriage in the first horizontal direction;
   the main body assembly is connected to the second support element by a second main body articulation, wherein the second main body articulation is configured such that the main body assembly can rotate with respect to the second lateral support around the main body axis transversally arranged with respect to the first direction and to the first horizontal direction;
   the main body assembly is arranged between the first and the second support elements; and
   the second support element further comprises a second lateral pivot guide connectable to the at least one contact pivot shaft, so that the at least one contact pivot shaft is displaceable along the second lateral guide.

20. The manual ceramic cutter according to claim 18, wherein the main body axis is coincident with the second axis.

* * * * *